Patented May 20, 1947

2,420,736

UNITED STATES PATENT OFFICE 2,420,736

TREATMENT OF PROTEIN WITH ACIDS AND FURFURYL ALCOHOL AND PRODUCT RESULTING THEREFROM

John Robert Coffman, St. Paul, Minn., and Harry F. Lewis, Appleton, Wis., assignors, by mesne assignments, to General Mills, Inc., a corporation of Delaware No Drawing. Application August 23, 1945, Serial No. 612,308

8 Claims. (Cl. 260—112)

The present invention relates to modified proteins and to a process of effecting such modification and more particularly to the modification of proteins for use in plastics having low water absorption properties.

The present application is a continuation in part of our co-pending application, Serial No. 448,292, filed June 24, 1942.

Numerous attempts have been made to modify proteins to make them satisfactory for use as plastics, in view of the low cost of such proteins and in view of their ready availability. In general, most of those protein plastics have proved unsuccessful commercially except in very limited circumstances. They absorb excessive quantities of water and as a result lose their shape. In some instances this excessive absorption of water also results in such a loss of strength that the products disintegrate very readily. These disadvantages are emphasized in certain uses of plastics such, for example, as machine parts in which close tolerances are required. The protein plastics of the prior art lose their shape to such an extent when they absorb water that they are entirely unsuitable for such uses.

It has now been discovered that proteins may be treated according to the present invention to produce a product of materially reduced water absorption. In general, the water absorption of protein after treatment according to the present invention is reduced to a small fraction of what it was prior to treatment.

It is, therefore, the principal object of the present invention to provide a modified protein having low water absorption properties. It is a further object of the present invention to provide a method of producing such modified protein.

These and other objects of the invention will be apparent from the following description thereof with particular reference to specific examples which are given for the purpose of illustration and which are not to be construed as limiting the invention.

The invention is applicable to proteins in general, such as casein, soybean protein, zein, wheat gluten, and the like, whether isolated from materials with which they naturally occur or in admixture with other materials. For purposes of the present invention the treatment will be described with particular reference to wheat gluten, it being understood that similar treatment is applicable to other proteins.

The invention involves the treatment of the protein with furfuryl alcohol. The proteins may be in an unmodified condition or as modified by treatment with acid as disclosed in the application previously referred to and in my co-pending application entitled Protein modification, Serial No. 612,307, filed of even date herewith.

The furfuryl alcohol treatment results in a pronounced reduction in the water absorption properties. The furfuryl alcohol apparently esterifies carboxyl groups on the protein molecule, which carboxyl groups may be those originally present in the protein molecule or may be produced by the acid treatment as will be pointed out more fully hereinafter. When the furfuryl alcohol treatment is applied to the unmodified protein, the protein apparently undergoes an alcoholysis reaction in which ammonium groups and primary amide groups are hydrolyzed and the resultant carboxyl groups are immediately esterified with furfuryl alcohol.

In addition to the furfuryl groups introduced into the protein molecule as above described, it is believed that additional furfuryl groups combine, perhaps by polymerization with the furfuryl ester groups previously introduced. Regardless of the theory of operation it is noted that furfuryl alcohol in excess of that required to esterify carboxyl groups may be consumed during the treatment.

*Preliminary acid treatment*

The preliminary acid treatment previously referred to involves the treatment of proteins with relatively concentrated solutions of highly ionized mineral acids such as hydrochloric acid and sulfuric acid, either alone or in admixture, or in combination with nitrous acid. The treatment with highly ionized mineral acid in the absence of nitrous acid which treatment for simplicity will be referred to as the mineral acid treatment, hydrolyzes ammonium salt groups into free acid and also hydrolyzes part of the amide groups to free acids. A large part of the amide groups remains unaffected as do all of the primary amine groups. The treatment of the protein with highly ionized mineral acid and nitrous acid which treatment is referred to herein as nitrous acid treatment, completely hydrolyzes all ammonium salt groups and all primary amide groups, and at the same time converts primary amine groups to hydroxyl groups. The nitrous acid treated protein is a significantly superior protein as will be apparent more fully hereinafter.

Analytical data points to the fact that each of these treatments affects the protein chemically in the manner described above. Thus, the base binding capacity of the treated protein is materially higher than that of the untreated protein, indicating hydrolysis of ammonium and amide groups to carboxyl groups. Formol titration of the nitrous acid treated proteins shows no primary amine groups, indicating the conversion of primary amine groups to hydroxyl groups. Moreover, the nitrous acid treatment results in the evolution of large quantities of nitrogen, which is characteristic of the conversion of amine groups to hydroxyl groups and the conversion of primary amide and ammonium salt groups to carboxyl groups.

The treatments herein described appear to be effected without any appreciable hydrolysis of the peptide bonds. Formol titration, which measures primary amine groups, when applied to the starting material and to the mineral acid treated material, shows no change in the content of the primary amine groups. Since hydrolysis of peptide bonds would result in an increase in primary amine groups it was concluded that no hydrolysis of peptide bonds had occurred. Since nitrous acid results in a destruction of primary amine groups it is apparent that formol titration of the nitrous acid treated gluten would not be significant as a measure of the peptide bond hydrolysis. However, the conditions affecting hydrolysis were substantially the same in the nitrous acid treatment as they were in the mineral acid treatment and accordingly it was concluded that no hydrolysis resulted from the nitrous acid treatment.

The mineral acid treatment involves the suspension of the protein material in highly ionized mineral acid which is not appreciably lower in concentration than 1N. Where the concentration is lowered appreciably below 1N the desired effects are not noted to any substantial extent. The suspension of protein in acid is preferably allowed to stand at room temperature for an extended period of time as, for example, 20 hours. Thereafter, the material is heated to an elevated temperature, for example 75° C. and the insoluble material separated from the acid. Part of the protein becomes soluble in the acid and can be separated therefrom by adjusting the pH to a suitable higher value or by precipitating it as an aluminum or lead salt which can subsequently be regenerated with acid. The separated proteins can be suitably processed for removal of adherent acid and other impurities to yield the desired products.

The nitrous acid treatment involves treatment of the protein with a mixture of nitrous acid and a highly ionized mineral acid such as hydrochloric or sulfuric in which the hydrogen ion concentration is not appreciably lower in concentration than 1N. The treating acid is preferably obtained by suspending the protein in an aqueous solution of a soluble nitrite such as sodium nitrite and then making the suspension acid with, for example, hydrochloric acid in sufficient quantity and of sufficiently high concentration that the hydrogen ion concentration in the mixture will not be appreciably lower than 1N. The processing of the nitrous acid treated product may parallel that of the mineral acid treated material in many respects. The nitrous acid treatment, however, is far superior. In this treatment the majority of the protein is recovered as an insoluble portion whereas in the mineral acid treatment the majority of the protein is soluble in the treating acid. Moreover, the nitrous acid treatment results in a granular product which may be readily washed with water or other solvent for the separation of impurities. The mineral acid treated product, on the other hand, is colloidal and requires more careful treatment for purification.

*Furfuryl alcohol treatment*

The furfuryl alcohol treatment involves the reaction of the protein, unmodified or modified as above, with an excess of furfuryl alcohol at an elevated temperature, either with or without a catalyst. Usually the furfuryl alcohol should not be used in any ratio lower than three parts of furfuryl alcohol to one part of protein. Higher ratios such as four to one are preferred. Temperatures at least as high as 130° C. are to be preferred. If the temperature drops appreciably below this the desired reaction is not likely to occur. The temperature may be conveniently held between 130° C. and 160° C. Temperatures between 145° and 150° C. have been found desirable. The time period may vary somewhat. A period of 15 hours at the temperature range 145–150° C. has been found satisfactory. In general, the higher the temperature, the shorter the time period required. Usually, however, the time can not be shortened to less than six hours.

After the desired reaction the products are recovered by vacuum distillation of excess furfuryl alcohol, or by precipitating the product in organic solvent compatible with furfuryl alcohol such as ether, acetone, dioxane, etc.

The following examples will serve to illustrate the invention.

*Example 1.—Acid gluten*

100 grams of fat-free gluten were suspended with 1 liter of N HCl and stirred at room temperature for 20 hours. The pH of the suspension at first was 0.38 and after 20 hours was 0.48. The suspension was then heated to 75° C. and centrifuged. This suspension was gummy and filtration was impractical. This is in contrast to the nitrous acid gluten preparation which is mealy and readily filtered. The insoluble material was suspended in four separate one-liter portions of water, each washing was centrifuged to separate the wash water. A fifth wash, in which the insoluble material was suspended in 500 cc. of water and the pH of the suspension was adjusted to 3.8, completed the water extraction of the insoluble phase. The washed insoluble gluten was dehydrated in 400 cc. of acetone and dried at 110° C. for two hours. This product will be referred to as HCl gluten A. The acid separated after the first treatment of the gluten failed to yield a precipitate upon progressive adjustment of the pH to higher values. The wash waters from the insoluble gluten each gave a precipitate when adjusted to a pH of from 3.5 to 3.8. These preciptates were combined and treated with 500 cc. of 70% alcohol. This gave two fractions, one alcohol soluble and the other alcohol insoluble. These were dried for two hours at 110° C. The alcohol soluble fraction is referred to as HCl gluten B, and the alcohol insoluble fraction is referred to as HCl gluten C. The following table will illustrate some of the properties of these fractions.

| Fraction | BBC×10⁻⁵ Equivalent Per Gram | 24-Hour Water Absorption, Per Cent |
| --- | --- | --- |
| Gluten | 31 | 40 |
| HCl Gluten A | 112 | 21 |
| HCl Gluten B | 127 | 32 |
| HCl Gluten C | 126 | 20 |

Example 2.—HONO gluten 500 grams of fat-free gluten were suspended in three liters of an aqueous solution containing 104 grams of sodium nitrite and the suspension was stirred for three hours at room temperature. To this suspension there were added in a dropwise manner 273 cc. of 12N HCl over a period of 1.5 hours. The acidified solution was allowed to stand over night, heated to 75° C. and filtered. It was washed by three one-liter portions of water. The gluten was subjected to a second washing with two more liters of water and filtered. The washed gluten was stirred with two liters of water, the suspension adjusted to a pH of 3.0, and filtered. The gluten was dehydrated with two liters of acetone and dried at 50° C. The dried material when suspended in water gave slight chloride ion tests. It was therefore rewashed with water until the washings were free of chloride ion. The base binding capacity of the original gluten was 31 while that of the nitrous acid gluten was 111. These and other base binding capacities are expressed as equivalents$\times 10^{-5}$ per gram. An additional quantity of nitrous acid gluten may be recovered from the acid filtrate and the various wash waters by pH adjustment, for example to pH values of 2.0, 3.5, 4.0, and 5.5. This material requires more extensive washing for removal of water solubles, but the final product appears to differ principally from the acid insoluble material in its base binding capacity, which was found to be 166. The 24-hour water absorption of the nitrous acid treated gluten was 21 as compared with a value of 40 for the untreated protein.

Example 3.—HONO-casein, zein and soya protein products 250 grams of each of the proteins—casein, zein, and soya protein—were suspended in separate 1.5 liter portions of 0.5N sodium nitrite solution and stirred for three hours at room temperature. To these suspensions there was then added, in a dropwise manner, 136 cc. of 12N hydrochloric acid while the protein suspension was well stirred. The resulting mixtures were allowed to stand eighteen hours at room temperature. They were then heated to 75° C., filtered, and washed well with water until the washings gave only a slight positive test for chloride ions. The products were drained well and dried at 70° C. for twenty hours. In the case of casein and soybean protein, the manipulation was simple throughout and the product appeared mealy in all stages of the procedure. The zein tended to form a cake, floating on the surface. However, agitation served to break up the cake into granular particles. Following the reaction the cake which was produced was placed in a Waring Blendor and disintegrated in water so that the resulting material was like fine sand.

| Product | BBC$\times 10^{-5}$ Equivalent Per Gram | 24-Hour Water Absorption, Per Cent |
| --- | --- | --- |
| Gluten | 31 | 40 |
| HONO Gluten | 111 | 21 |
| Casein | 83 | 42 |
| HONO Casein | 147 | 25 |
| Soy Protein | 94 | 42 |
| HONO Soy Protein | 137 | 22 |
| Zein | 0 | 13 |
| HONO Zein | 80 | 5 |

Example 4.—Furfuryl alcohol-protein and HONO protein products 50 grams each of fat-free gluten and nitrous acid gluten (acid insoluble material from Example 2) were placed in separate flasks and suspended in 300 cc. of redistilled furfuryl alcohol. These suspensions were heated at between 145° and 150° C. in an air oven for 15 hours. The furfuryl alcohol-protein mixtures were dark brown to black viscous liquids after the heating periods and appeared to be quite homogeneous. Each of these solutions was poured into 2.5 liters of ether and the precipitate filtered off, washed with ether, and extracted in a Soxhlet extractor until the ether remained colorless. The products were then dried. The furfuryl gluten A was a light tan powder. The furfuryl nitrous acid gluten B was a brown powder. The resultant products were subjected to the following modifications. The untreated products are referred to as furfuryl gluten A-1 and furfuryl nitrous acid gluten B-1. To 4 grams of each there was added 1 cc. of 6% sulfuric acid in acetone. These products are referred to as A-2 and B-2, respectively. To 4 grams of each A-1 and B-1 there were added 1 cc. of furfural, and 1 cc. of 6% sulfuric acid in acetone. The mixture was then heated at 130° C. for one hour. These products are referred to as A-3 and B-3, respectively. To 4 grams of each A-1 and B-1 there was added 0.2 gram of maleic anhydride in 2 cc. of chloroform. These products are referred to as A-4 and B-4, respectively. The following table illustrates the water absorption properties of the various products.

| Material | Relative Values for 24-Hour Water Absorption, per cent |
| --- | --- |
| Furfuryl Gluten A-1 | 26 |
| Furfuryl Gluten A-2 | 29 |
| Furfuryl Gluten A-3 | 13 |
| Furfuryl Gluten A-4 | 19 |
| Gluten only | 40 |
| Furfuryl Nitrous Acid Gluten B-1 | 2.1 |
| Furfuryl Nitrous Acid Gluten B-2 | 1.6 |
| Furfuryl Nitrous Acid Gluten B-3 | 1.5 |
| Furfuryl Nitrous Acid Gluten B-4 | 1.3 |
| Nitrous Acid Gluten only | 20 |

Example 5.—Furfuryl alcohol-casein, soya protein, and zein products 100 grams of each of the proteins casein, soybean protein and zein were suspended in 400 cc. of redistilled furfuryl alcohol and the mixture heated at 146–152° C. for fifteen hours. The heated material appeared as a black liquid. In the case of the casein, it was a semi-solid mass and required the addition of furfuryl alcohol to dissolve it so that it could be removed from the flask. The black liquid was slowly poured into 2 liters of ether. The supernatant ether was decanted and the precipitate stirred with one liter of ether and then filtered. The precipitate was again washed with one liter of ether and then extracted with ether in a Soxhlet extractor until the solvent remained colorless. The product was dried at 110° C. for one hour.

Example 6.—HONO-furfuryl alcohol-casein, zein and soya protein products 75 grams of each of the nitrous acid protein products of Example 4 were suspended in 300 cc. of redistilled furfuryl alcohol and heated at 146–

152° C. for fifteen hours. The heated material appeared as a black jelly-like to rubbery mass. This was removed from the flask with the aid of acetone and the final suspension of the black mass in the acetone was obtained by means of a Waring Blendor. The acetone suspension was poured into two liters of ether and the product worked up as outlined in Example 5. The product was dried at 70° C. for eighteen hours.

The following table illustrates some of the properties of the products disclosed herein. It is to be noted that the water absorption values heretofore given have been on the basis of 24-hour immersion of a 1-inch disk. Some of these values are given in the following table. The ASTM test for water absorption involves the use of a 4-inch disk. For the purpose of comparison a number of such tests were made and are likewise included in the following table. It will be apparent that the water absorption values by the ASTM method are lower than that for the 1-inch disk. It is evident, therefore, that the water absorption values heretofore given would be further reduced upon test by the ASTM method.

| Product | Water Absorption, per cent | | |
|---|---|---|---|
| | 24 hr. 1″ disk | 24 hr. 4″ disk | 48 hr. 4″ disk |
| Fat-free gluten | 40 | 34.3 | 49.3 |
| Casein | 42 | | |
| Soya Protein | 42 | | |
| Zein | 13 | | |
| Acid treated gluten | 24 | | |
| HONO gluten | 21 | | |
| HONO casein | 25 | | |
| HONO soya protein | 22 | 12.7 | 21.6 |
| HONO zein | 5 | 4.2 | 6.4 |
| Gluten-furfuryl alc | 26 | | |
| Casein-furfuryl alc | 1.6 | 0.82 | 1.46 |
| Soya protein-furfuryl alc | 2.5 | 0.96 | |
| Zein-furfuryl alc | 2.6 | 0.94 | 1.47 |
| Acid gluten-furfuryl alc | 0.5 | 0.25 | 0.46 |
| HONO gluten-furfuryl alc | 1.6 | 0.51 | 0.67 |
| HONO casein-furfuryl alc | 0.6 | 0.26 | 0.43 |
| HONO soya-furfuryl alc | 1.5 | 0.54 | 0.87 |
| HONO zein-furfuryl alc | 0.6 | 0.17 | 0.40 |

It will be apparent from the above examples that the product herein described results in a decided improvement in the characteristics of the protein, thus making the material more useful in instances where water absorption is an important factor. Substituted furfuryl alcohols may also be used in place of unsubstituted furfuryl alcohol, such as alcohols in which the furane nucleus is intact but which contains substituents in positions 3, 4, or 5, all of which alcohols are contemplated by the term, furfuryl alcohol, as used in the claims. It will also be apparent that the invention is not limited to the specific examples given above and that various modifications may be made without departing from the spirit of the invention as defined in the appended claims.

We claim as our invention:

1. A modified protein characterized by reduced water absorption, said protein having the major proportion of its peptide bonds intact and having ammonium groups and primary amide groups converted to COOX groups in which X is a furfuryl group.

2. A modified wheat gluten characterized by reduced water absorption, said wheat gluten having the major proportion of its peptide bonds intact and having ammonium groups and primary amide groups converted to COOX groups in which X is a furfuryl group.

3. A modified zein characterized by reduced water absorption, said zein having the major proportion of its peptide bonds intact and having ammonium groups and primary amide groups converted to COOX groups in which X is a furfuryl group.

4. A modified soy protein characterized by reduced water absorption, said soy protein having the major proportion of its peptide bonds intact and having ammonium groups and primary amide groups converted to COOX groups in which X is a furfuryl group.

5. Process for the modification of protein to reduce its water absorptive properties which comprises treating the protein with a treating agent selected from the group consisting of hydrochloric acid and sulfuric acid and a mixture of one of said acids and nitrous acid, the hydrogen ion concentraction of the treating agent being not substantially lower than 1N, for an extended period of time to convert ammonium groups and primary amide groups to carboxyl groups and in the case of nitrous acid to convert primary amine groups to hydroxyl groups without extensive hydrolysis of the peptide bonds and thereafter treating the thus modified protein with furfuryl alcohol to esterify carboxyl groups.

6. Process for the modification of protein to reduce its water absorptive properties which comprises treating said protein with a treating agent comprising hydrochloric acid, the hydrogen ion concentration of the treating agent being not substantially lower than 1N, for an extended period of time to convert at least part of the ammonium groups and primary amide groups to carboxyl groups without extensive hydrolysis of the peptide bonds, and thereafter treating the thus modified protein with furfuryl alcohol to esterify the carboxyl groups.

7. Process for the modification of protein to reduce its water absorptive properties which comprises treating said protein with a treating agent comprising a mixture of hydrochloric acid and nitrous acid, the hydrogen ion concentration of the treating agent being not substantially less than 1N, for an extended period of time to convert ammonium groups and primary amide groups to carboxyl groups, and to convert primary amine groups to hydroxyl groups without extensive hydrolysis of the peptide bonds and thereafter treating the thus modified protein with furfuryl alcohol to esterify the carboxyl groups.

8. Process for the modification of protein to reduce its water absorptive properties which comprises treating the protein with furfuryl alcohol for an extended period of time at a temperature not substantially less than 130° C. to produce furfuryl esters of the protein.

JOHN ROBERT COFFMAN.
HARRY F. LEWIS.

REFERENCES CITED

The following references are of record in the file of this patent:

UNITED STATES PATENTS

| Number | Name | Date |
|---|---|---|
| 2,169,955 | Koch | Aug. 15, 1939 |
| 2,158,117 | Grettie | May 16, 1939 |
| 2,185,119 | Coleman | Dec. 26, 1939 |
| 2,185,126 | Coleman | Dec. 26, 1939 |